United States Patent
Iifliyandskyi et al.

(10) Patent No.: US 9,889,731 B2
(45) Date of Patent: Feb. 13, 2018

(54) PROTECTIVE DEVICE FOR A VEHICLE (OPTIONS)

(76) Inventors: Igor Iifliyandskyi, Jerusalem (IL); Oleg E. Mikhailov, Moscow (RU); Boris L. Bobrovnikov, Moscow (RU)

( * ) Notice: Subject to any disclaimer, the term of this patent is extended or adjusted under 35 U.S.C. 154(b) by 0 days.

(21) Appl. No.: 14/386,796

(22) PCT Filed: Aug. 21, 2012

(86) PCT No.: PCT/RU2012/000690
§ 371 (c)(1),
(2), (4) Date: Sep. 20, 2014

(87) PCT Pub. No.: WO2013/169144
PCT Pub. Date: Nov. 14, 2013

(65) Prior Publication Data
US 2015/0076857 A1    Mar. 19, 2015

(30) Foreign Application Priority Data
May 5, 2012 (RU) ................................. 2012118545

(51) Int. Cl.
*B60J 11/02* (2006.01)
*B62D 35/00* (2006.01)
*B60R 5/04* (2006.01)
*B60R 9/06* (2006.01)

(52) U.S. Cl.
CPC ............... *B60J 11/02* (2013.01); *B60R 5/04* (2013.01); *B60R 9/065* (2013.01); *B62D 35/007* (2013.01)

(58) Field of Classification Search
CPC .......... B60J 11/02; B62D 35/007; B60R 5/04; B60R 9/065
See application file for complete search history.

(56) References Cited

U.S. PATENT DOCUMENTS

| | | | | |
|---|---|---|---|---|
| 5,294,170 A * | 3/1994 | Hsueh | ...................... | B60J 11/02 296/136.02 |
| 6,644,716 B1 * | 11/2003 | McNabb | .................. | B60J 11/08 296/136.1 |
| 7,337,793 B2 * | 3/2008 | Chen | ....................... | B60J 11/02 135/117 |
| 7,464,982 B1 * | 12/2008 | Lin | .......................... | B60J 11/02 296/136.01 |
| 7,673,924 B1 * | 3/2010 | Lau | .......................... | B60J 11/08 296/95.1 |
| 2013/0214554 A1 * | 8/2013 | Taylor | ..................... | B60J 11/02 296/136.01 |

* cited by examiner

Primary Examiner — D Glenn Dayoan
Assistant Examiner — Melissa A Black
(74) Attorney, Agent, or Firm — Inventa Capital PLC

(57) ABSTRACT

A protective device for a vehicle includes a flexible cover duplicating the contours of the car, and a container, in which the flexible cover is arranged. The container can be fastened in the rear part of the vehicle with the aid of at least one fastening element. The flexible cover is polymeric, with a light-reflecting material or coating applied to one side and a light-absorbing material or coating applied to the other side. The container can be fastened on the vehicle boot or on the rear part of the vehicle roof or on the vehicle bumper. In another alternative, the container of the protective device can be fastened on the internal side of the vehicle boot lid with the aid of at least one fastening element. The protective device provides reliable and durable protection for the car from overheating in summer and from super cooling in winter.

28 Claims, 5 Drawing Sheets

PROTECTIVE DEVICE FOR A VEHICLE (OPTIONS)

BACKGROUND OF THE INVENTION

The utility model relates to the protection of vehicles, namely, protective outer cases intended to protect parked automobiles from the environmental effects: mud, snow, rain, hail, and summer overheating of the vehicle and winter overcooling at short stands in between trips.

Known is a protective case for a vehicle RU No 222439070, B60R 11/00 Jan. 10, 2005. The case follows the automobile outline and ensures protection of parked automobiles from the environmental effects. However, this case is inconvenient in terms of installation on and removal from the vehicle as the case has to be repeatedly folded/unfolded and, furthermore, it takes additional space in the trunk. Another drawback of this case is that it is not designed to protect the vehicle from overheating in summer and overcooling in winter.

Known is a protective case for a vehicle US 2008174144 A1, B60J 11/0000, Jul. 24, 2008. The protective case consists of a layer of high-strength polymer and a light-reflecting layer of metal foil. The case follows the automobile outline and ensures protection of parked automobiles from the environmental effects and protects the vehicle from overheating in summer. However, this case is also inconvenient in terms of installation on and removal from the vehicle as the case has to be repeatedly folded/unfolded and, furthermore, it also takes additional space in the trunk.

Known is a protective device for a vehicle CN 201784442 U, B60J 11/02, Apr. 6, 2011 (prototype of the first option). This protective device contains a flexible case that follows the automobile outline and a container that houses the flexible case. The container is installed in the rear of the automobile. The flexible case is wound on the rotating shaft installed in the container. This protective device allows for convenient storage, easy and quick installation and removal of the flexible case from the vehicle, as it does not have to be carried in the trunk and it is always available. However, the protective device is not designed to protect the vehicle from overheating in summer or overcooling in winter.

Known is a protective device for a vehicle CN 201009718 Y, B60J 11/02, Jan. 23, 2008 (prototype of the second option). Such a protective device contains a flexible case that follows the automobile outline and a container that houses the flexible case. The container is installed in the rear of the automobile on the inner side of the trunk. The flexible case is wound on the rotating shaft installed in the container. This protective device allows for convenient storage, easy and quick installation to and removal of the case from the vehicle, as it does not have to be carried in the trunk and it is always available. However, the protective device is not designed to protect the vehicle from overheating in summer or overcooling in winter.

SUMMARY OF THE INVENTION

The technical result achieved in the claimed solution aims to create reliable protection of vehicles from the environmental effects via a protective device designed to protect the vehicle from overheating in summer and overcooling in winter.

As regards the first embodiment, the technical result is achieved through having the first embodiment protective device for a vehicle to include a flexible case that follows the automobile outline and a container to house a flexible case, and the container is designed so as to be secured in the rear of the vehicle with the help of at least one fastening element, whereas the flexible case is made of polymer with a reflective material or a reflective coating on one side or a light-absorbing material or light-absorbing coating on the other side.

As regards the second embodiment, the technical result is achieved through having the protective device for a vehicle to include a flexible case that follows the automobile outline and a container to house a flexible case, and the container is designed so as to be secured in the rear of the automobile from the internal side of the vehicle trunk cover vehicle with the help of at least one fastening element, whereas the flexible case is made of polymer with a reflective material or a light-absorbing coating on one side or a light-absorbing material or light-absorbing coating on the other side.

The reflective material or coating is a reflective metallized material or coating applied to one side of the flexible polymer case, and the light-absorbing material or coating represents a light-absorbing metallized material or coating applied on the other side of the flexible polymer case. The reflective material or coating is in the form of film material based on polyethylene terephthalate, polyester or other polymeric materials and their copolymers suitable for prolonged use in open terrain in all climatic zones. This material is resistant to mechanical strains and abrasive wear and has, on one side, a metallized layer ensuring reflection of heat radiation, and, on the other side a layer of metallic or other coating that facilitates absorption of heat radiation.

The vehicle container represents a base and a cover that is connected to each other and are detachable. The base and the cover can be connected to each other by any known means, for example, using loops.

The container can be secured on the vehicle trunk or on the rear part of the vehicle roof or on the vehicle bumper. The container is mounted to the vehicle with a fastening element that can comprise at least one magnet and/or at least one threaded element. At its base, the container can have a magnetic part that is attracted to the magnet installed on the internal side of the trunk or on the internal side of the trunk upholstery. The compressional force of the magnet and the container base is calculated so that they are not uncoupled inadvertently at a maximum speed.

The container can also be made in the shape of an antiwing (spoiler) which provides greater device functionality, compactness and ease of storage.

The flexible case is stowed in the container base and secured with one end inside the base and/or to the container cover. The other end of the flexible cover contains fasteners to the vehicle, for example, hooks and/stickers and/or snaps and/or magnets. In the extracted position of the flexible case, the fastening elements allow securing the end of the flexible case in the front part of the vehicle. Importantly, the flexible case can be detached from the base and/or cover and flipped, thereby switching the automobile's outer sheath between the light-absorbing cover in winter and the reflecting cover in summer. Another embodiment is to place inside the container base a rotating shaft with a flexible case wound around it. The shaft is rotated manually or automatically by a motor with a portable power source. Furthermore, the motor can be switched on remotely or by pressing the button installed in the container. The rotating shaft is designed so that it can be detached from the inner cavity of the container's base. Importantly, the flexible case can also be detached from the rotating shaft and flipped, thereby switching the outer sheath of the automobile between the light-absorbing cover in winter and the reflecting cover in summer.

The container can contain an optional flexible case secured inside the base and/or to the cover. When extracted, the additional case covers the rear of the vehicle, the trunk and the rear bumper of the automobile. The optional flexible case is secured inside the basis and/or cover of the container and contains fasteners to the vehicle, such as hooks and/or stickers and/or snaps and/or magnets.

Alternatively, the flexible case is secured at one end inside the container's base, and at the other end—on the container's cover that is detachable from the base. When the flexible case is extracted from the container, the cover is secured to the front of the vehicle with at least one fastener that is placed on the cover and represents a sticker and/or hook and/or snap and/or magnet.

Where the container is secured to the internal side of the trunk, the thickness of the flexible case should preferably be no more than 2 mm.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1:
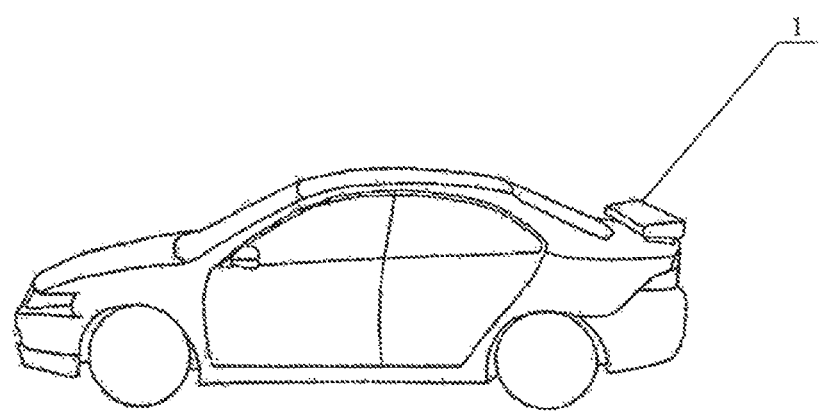
FIG. 1 is a general view of the vehicle—a passenger car with an installed protective device, according to a first embodiment.
Figure 2:
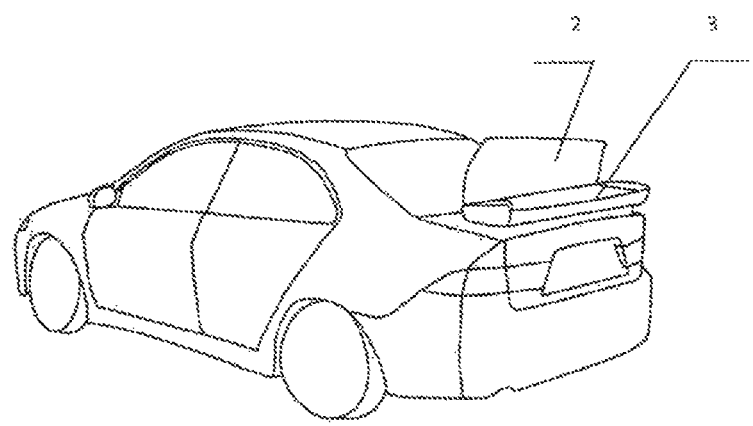
FIG. 2 is a perspective view of an opened protective cover of the container, according to the first embodiment.
Figure 3:
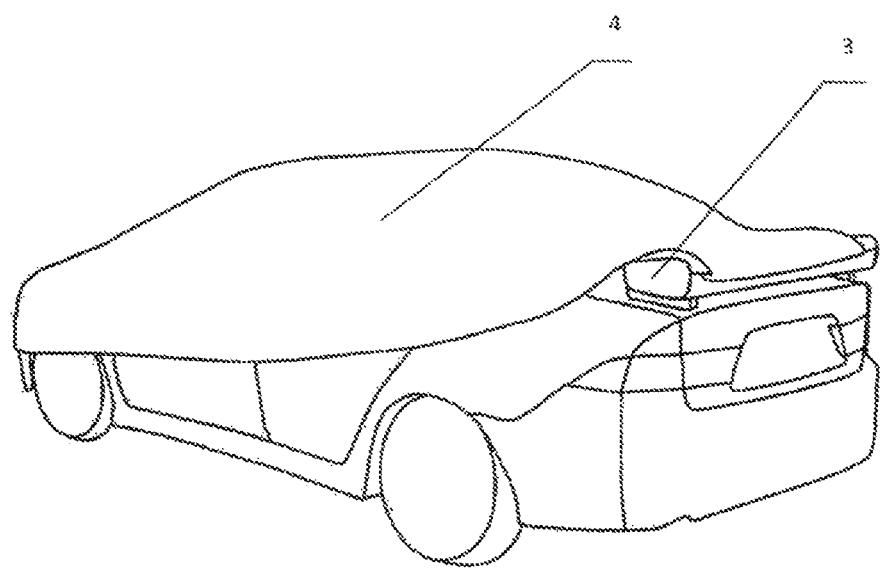
FIG. 3 is a general view of the proposed protective device, according to the first embodiment.
Figure 4:
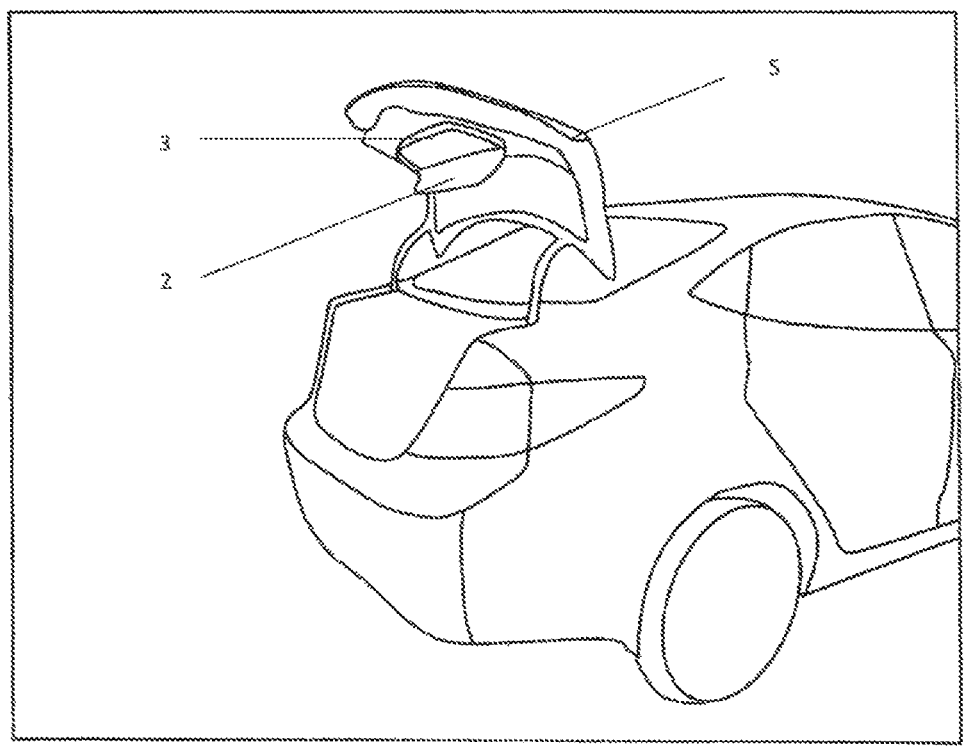
FIG. 4 shows the general view of the vehicle—a passenger car with an installed protective device, according to a second embodiment.
Figure 5:
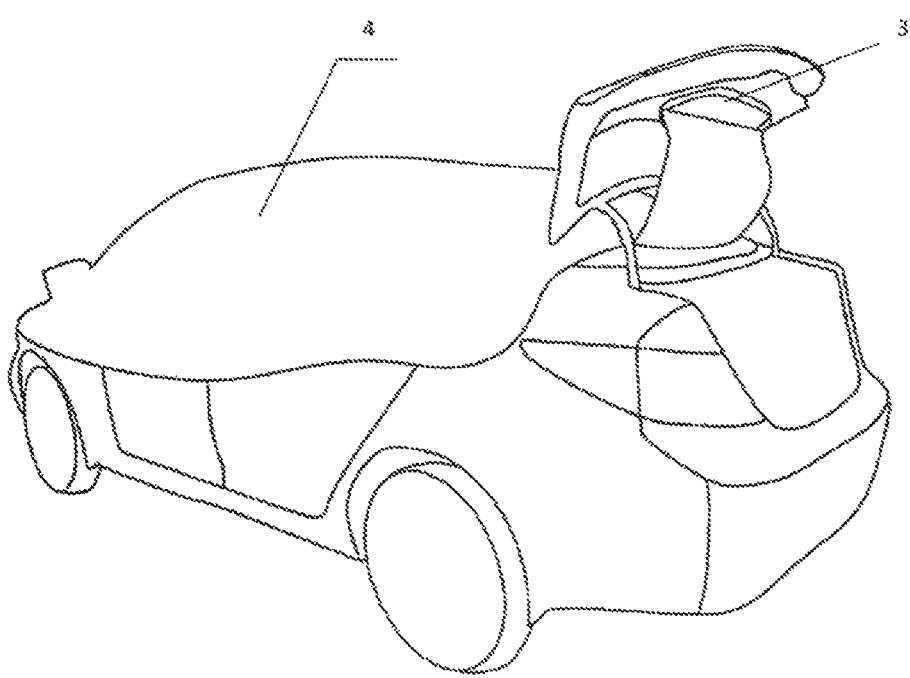
FIG. 5 is a general view of the proposed protective device, according to the second embodiment.

Referring to FIGS. 1 through 5, wherein like numerals indicate like or corresponding parts throughout the several views, the following elements are shown: a container 1, a cover of the container 2, a base of the container 3, a flexible case 4, and a trunk 5.

The protective device includes a container, a flexible case and at least one fastening element for fastening the container on the automobile. Container comprises a base and a cover that are detachable. The container can be made in the form of an antiwing (spoiler) of a vehicle. The flexible case is placed inside the container base and secured with one end inside the base and/or to the cover. The fastening element comprises, at least, one magnet with protective washers (to protect the paintwork of the automobile) so that the container can be quickly installed in the rear of the vehicle, and/or at least one threaded element. The container is mounted on the rear of the vehicle, such as on the trunk, at the rear of the roof, on the rear bumper, or from the inside of the trunk cover, with fasteners. If fastening is provided by magnets, the container's base has a magnetic part that is attracted to the magnet installed either on the internal side of the trunk or on the internal side of the trunk upholstery. Then the cover can be removed, the flexible case is extracted from the container base, stretched over the automobile and secured at the second end in the rear of the automobile, for example, to the front bumper of the automobile with fasteners that represent hooks and/or stickers and/or snaps and/or magnets, and thus the flexible case stretches from the container toward the front of the automobile. In addition, inside the container's base an additional flexible case also secured at one end inside the base and/or to the container's cover, at the other end of the additional flexible case are fasteners that allow securing the flexible case to, for example, the rear bumper of the automobile, thus the additional flexible case stretches from the container to the rear bumper of the automobile.

The flexible case is secured to the base and/or cover in a detachable manner and uses any known means, for example, with screws or nuts or other known bonds (adhesive, threaded, welded, etc.). Importantly, the flexible case can be detached from the base and/or cover and flipped, thereby switching the automobile's outer sheath between the light-absorbing cover in winter and the reflecting cover in summer. Thus, in the cold season, the light-absorbing side is used, which, apart from retaining the automobile's heat, heats up from the solar light. In hot weather, the user can flip the flexible case to the other side so as to put in use the reflective side of the flexible case.

Another option is to place inside the container base a rotating shaft with a flexible case wound around it and secured at one end. The shaft is rotated manually or automatically by a motor with a portable power source at the press of the button. In this example, the flexible case is unwound or wound by rotating the rotating shaft, including by means of an electric motor. The rotating shaft is designed so that it can be detached from the container's base. Importantly, the flexible case can also be detached from the rotating shaft and flipped, thereby switching the outer sheath of the automobile between the light-absorbing cover in winter and the reflecting cover in summer.

The protective flexible case is retracted into the container in the reverse order.

Thus, the claimed utility model achieves the technical result by way of creating reliable protection of the vehicle from the environmental effects via a protective device designed to protect the vehicle from overheating in summer and overcooling in winter.

Additional technical results achieved by the claimed utility model: reliable, durable and multi-purpose fastening of the protective device and of the flexible case or protective device cover provides reliable protection against the environmental effects; increased convenience is provided for the unwinding and winding of the flexible case due to the use of the automatically or manually rotated shaft with a flexible case; enhanced functionality and compactness of the device are provided due to the use of a container that represents an antiwing (spoiler) of the vehicle, and due to the fastening of a two-sided flexible case on different sides depending on the time of the year (summer, winter); the container of the protective device is installed without any additional work connected with installation thereof, if magnets are used for securing thereof; also, compactness of the device installation on the internal side of the trunk is provided due to the thickness of the flexible film of less than 2 mm, which enables the vehicle's trunk to be closed.

Given that the options described herein are preferred options of this utility model's implementation, it is apparent that these implementation options are only provided as examples. Experts in this field of technology can use numerous modifications, changes and substitutions that do not go beyond scope of the utility model.

The invention claimed is:

1. A protective device for a vehicle having a trunk presenting an inside surface of a trunk cover, the protective device comprising:
   a flexible case that follows the outline of the vehicle; and
   a container having a flat configuration and including a base and a cover, the base of the container secured to the inner surface of the trunk cover to house the flexible case, the cover extends through the opening formed between the trunk and a body of the vehicle at the front of a lid of the trunk when the lid of the trunk is in an open position, wherein the flexible case is made of polymer with at least one of a reflective material and a reflective coating on one side and a light-absorbing material and a light-absorbing coating on the other side, the flexible case is secured inside at least one of the base and the cover of the container.

2. The protective device for a vehicle of claim 1 wherein the container can be secured on at least one of the trunk of the vehicle, rear part of the vehicle, and on a bumper of the vehicle.

3. The protective device for a vehicle of claim 2 wherein the flexible case is secured on a rotating shaft installed inside a base of the container.

4. The protective device for a vehicle of claim 3 wherein the container is rotated manually or automatically by a motor with a portable power source.

5. The protective device for a vehicle of claim 1 wherein the fastening element includes at least one magnet and at least one threaded element.

6. The protective device for a vehicle of claim 2 wherein the container has in the base a magnetic part that is attracted to the magnet installed on the inside of the trunk.

7. The protective device for a vehicle of claim 2 the flexible case includes fasteners to the vehicle, including at least one of hooks, stickers, snaps, and magnets.

8. The protective device for a vehicle of claim 2 wherein the container includes an additional flexible case secured inside at least one of the base and to the cover.

9. The protective device for a vehicle of claim 8 wherein the additional flexible case includes fasteners to the vehicle, eluding at least one of hooks, stickers, snaps, and magnets.

10. The protective device for a vehicle of claim 2 wherein the cover is detachable.

11. The protective device for a vehicle of claim 10 wherein the cover includes fasteners to the vehicle, including at least one of hooks, stickers, snaps, and magnets.

12. The protective device for a vehicle of claim 10 wherein the container includes a spoiler of the vehicle.

13. The protective device for a vehicle of claim 10 wherein the reflective material and the coating presents a light-absorbing metallized material or coating applied on one side of the flexible polymer case.

14. The protective device for a vehicle of claim 13 wherein the light-absorbing material and the coating presents at least one of a heat-retaining light-absorbing metallized material and a coating applied on the other side of the flexible polymer case.

15. A protective device for a vehicle having a trunk presenting an inside surface of a trunk cover, the protective device comprising:
a flexible case that follows the outline of the vehicle;
a container having a flat configuration and including a base and a cover, the base of the container secured to the inner surface of the trunk cover to house the flexible case, the cover extends through the opening formed between the trunk at and a body of the vehicle at the front of a lid of the trunk when the lid of the trunk is in an open position, the container is secured in the rear of the vehicle from the inside of the cover of the trunk at least one fastening element; the flexible case is secured inside at least one of the base and the cover of the container; and
the flexible case made of polymer with at least one of a reflective material and a reflective coating on one side and at least one of a light-absorbing material and a reflective coating on the other side.

16. The protective device for a vehicle of claim 15 wherein the flexible case is secured on a rotating shaft installed inside a base of the container.

17. The protective device for a vehicle of claim 16 wherein the container is rotated manually or automatically by a motor with a portable power source.

18. The protective device for a vehicle of claim 15 wherein the fastening element comprises at least one magnet and at least one threaded element.

19. The protective device for a vehicle of claim 15 wherein at its base, the container has a magnetic part that is attracted to the magnet installed on the internal side of the trunk.

20. The protective device for a vehicle of claim 15 wherein the flexible case includes fasteners to the vehicle, including at least one of hooks, stickers, naps, and magnets.

21. The protective device for a vehicle of claim 15 wherein the container includes an additional flexible case secured at leak one of inside the base and to the cover.

22. The protective device for a vehicle of claim 21 wherein the additional flexible case contains fasteners to the vehicle, including at least one of hooks, stickers, snaps, and magnets.

23. The protective device for a vehicle of claim 15 wherein the cover is detachable.

24. The protective device for a vehicle of claim 23 wherein the cover includes fasteners to the vehicle, for including at least one of hooks, stickers, snaps, and magnets.

25. The protective device for a vehicle of claim 24 wherein the container presents at least one of an antiwing and a spoiler of the vehicle.

26. The protective device for a vehicle of claim 15 wherein the reflective material and the coating presents a light-absorbing metallized material or coating applied on one side of the flexible polymer case.

27. The protective device for a vehicle of claim 26 wherein the light-absorbing material and the coating presents at least one of a heat-retaining light-absorbing metallized material and a coating applied on the other side of the flexible polymer case.

28. The protective device for a vehicle claim 26 in any wherein the flexible case has a thickness of no more than 2 mm.

* * * * *